United States Patent
Stolpe et al.

[11] Patent Number: 6,022,113
[45] Date of Patent: Feb. 8, 2000

[54] EXTERNAL REARVIEW MIRROR FOR AUTOMOBILES

[75] Inventors: Thomas Stolpe, Eckental; Ralf Buffleben, Nürnberg, both of Germany

[73] Assignee: Gebr Buhler Nachfolger GmbH, Nuremberg, Germany

[21] Appl. No.: 09/126,227

[22] Filed: Jul. 30, 1998

[30] Foreign Application Priority Data

Jul. 30, 1997 [DE] Germany .......................... 197 32 801

[51] Int. Cl.⁷ .................................................. G02B 5/08
[52] U.S. Cl. ...................... 359/841; 359/872; 359/877; 248/479
[58] Field of Search ................................. 359/841, 872, 359/877; 248/549, 479, 876, 900

[56] References Cited

U.S. PATENT DOCUMENTS

| | | | |
|---|---|---|---|
| 5,156,540 | 10/1992 | Fernau et al. | 418/152 |
| 5,636,071 | 6/1997 | Mochizuki et al. | 359/841 |
| 5,703,732 | 12/1997 | Boddy et al. | 359/841 |
| 5,781,354 | 7/1998 | Sakata | 359/841 |

FOREIGN PATENT DOCUMENTS

| | | |
|---|---|---|
| 0 644 084 A1 | 3/1995 | European Pat. Off. . |
| 0 711 682 | 5/1996 | European Pat. Off. . |
| 0 818 354 | 1/1998 | European Pat. Off. . |
| 44 27 410 | 2/1996 | Germany . |
| 63-195042 | 8/1988 | Japan . |
| 7-291032 | 11/1995 | Japan . |
| 8-216783 | 8/1996 | Japan . |
| 9-030 328 | 2/1997 | Japan . |

*Primary Examiner*—Cassandra Spyrou
*Assistant Examiner*—Euncha Cherry
*Attorney, Agent, or Firm*—Thelen Reid & Priest LLP

[57] ABSTRACT

A rearview mirror device for a vehicle. The mirror device includes a mirror base adapted to be fastened to the vehicle. A mirror head which includes a mirror is pivotable relative to the mirror base around the pivot axis. First contact surfaces are formed on the mirror head. Second contact surfaces are formed on the mirror base for cooperating with the first contact surfaces for limiting the pivotal rotation of the mirror head relative to the mirror base from at least a drive position to a parking position. A gear wheel is connected to the mirror base and arranged coaxially to the pivot axis. The gear wheel engages with a drive motor. A folding-path limiter is positioned between the mirror head and the mirror base for limiting the movement of the mirror head relative to the mirror base and a compression spring and a latching structure are used to connect the gear wheel to the mirror base. The mirror head is operative in at least three predetermined levels (A,B,C) as measured along the pivot axis relative to the mirror base. Level A is possible only between the drive position and the park position, and is defined by the latching structure found on the gear wheel and on the mirror base. Level B is defined by the mirror head and the mirror base. Finally, level C is defined by the latching structure on the mirror base and by the gear wheel or by the latching structure on the gear wheel and the mirror base.

20 Claims, 8 Drawing Sheets

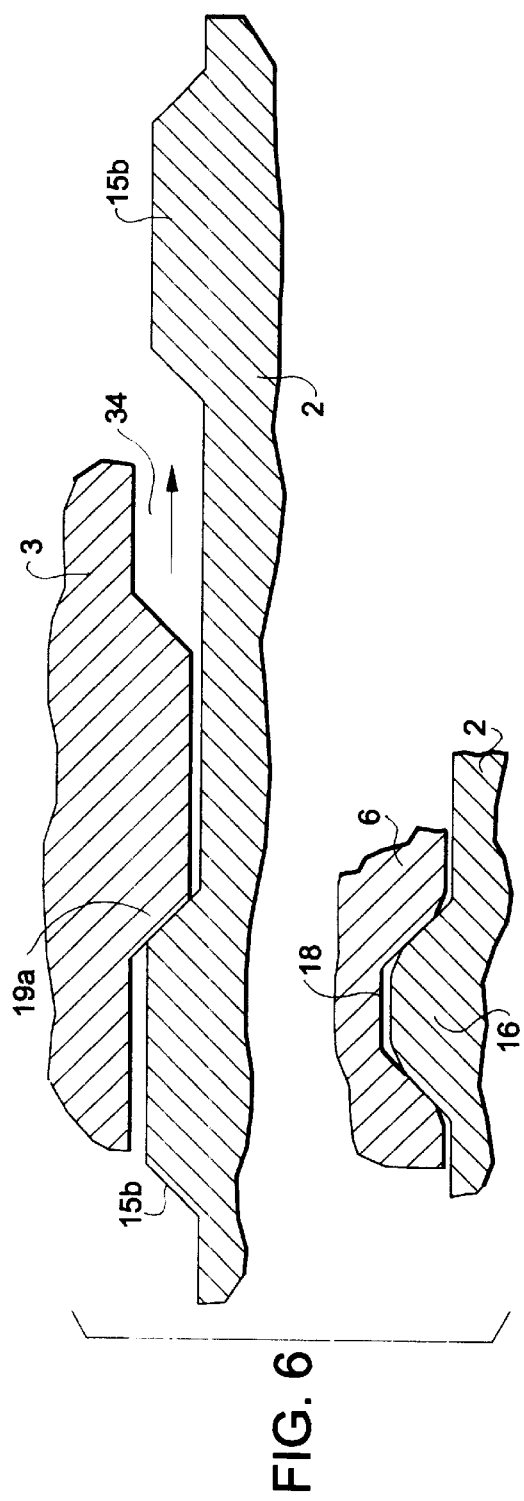
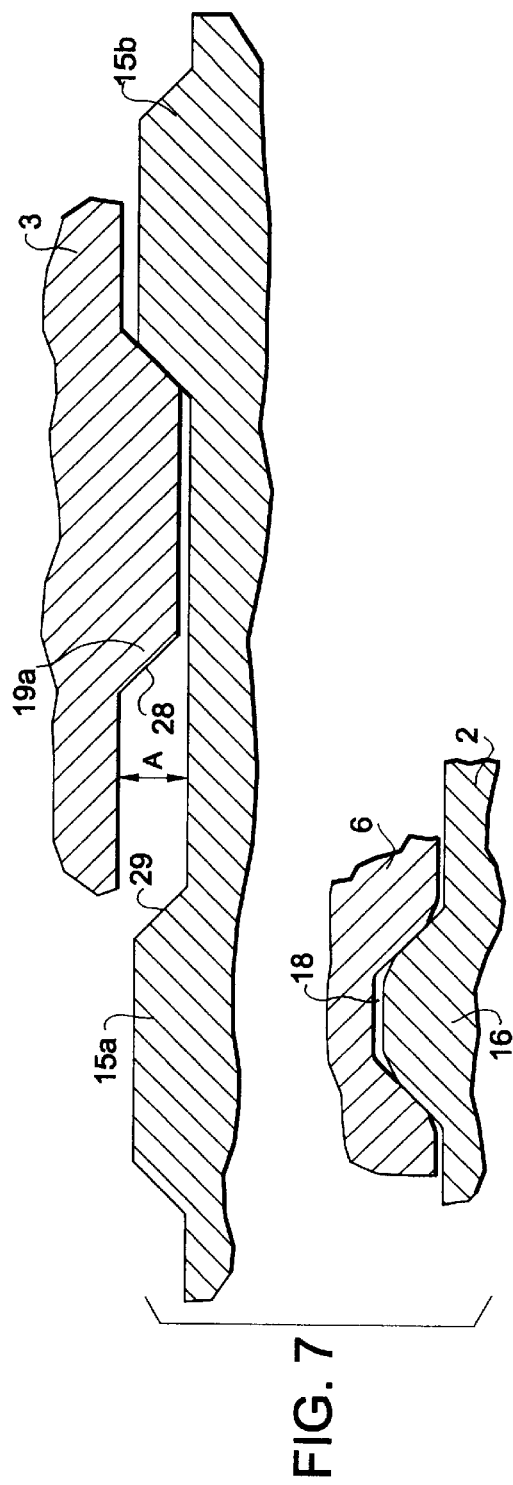
FIG. 6
FIG. 7

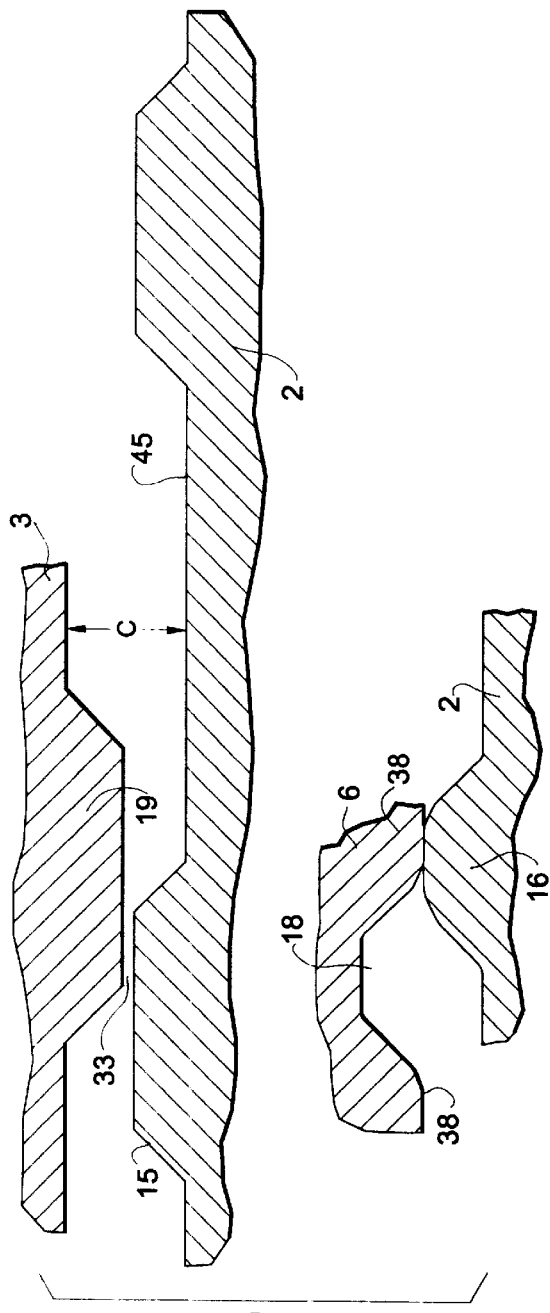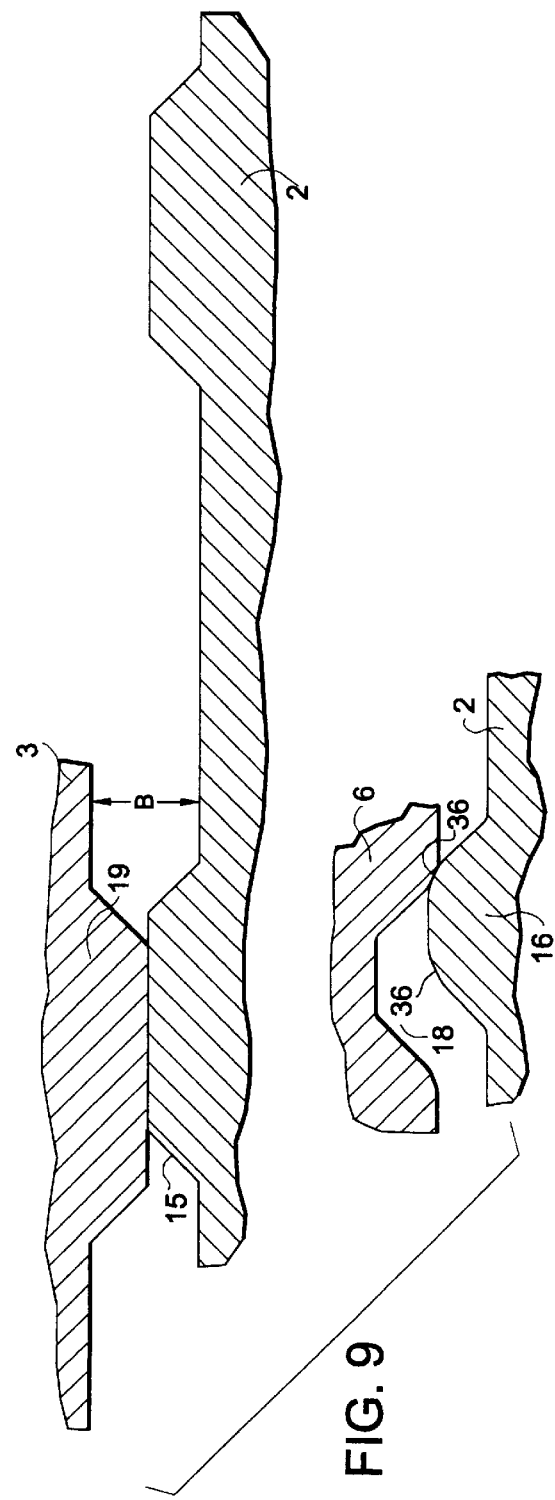

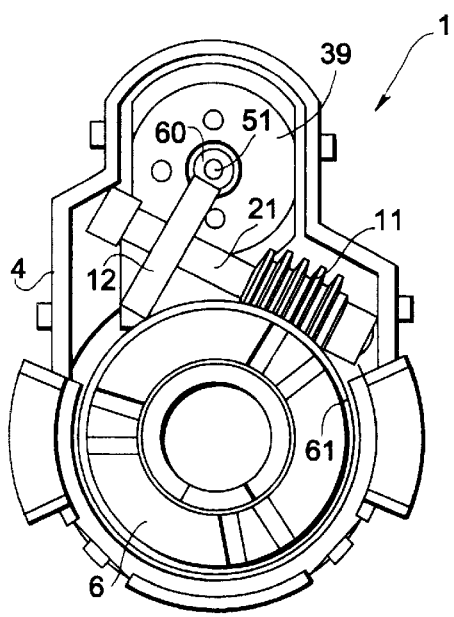
FIG. 11
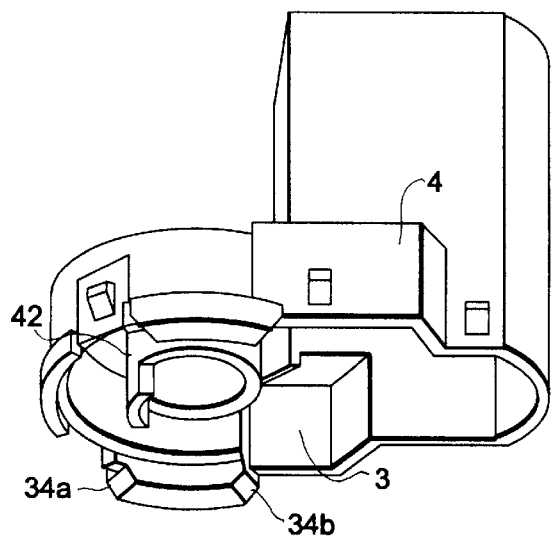
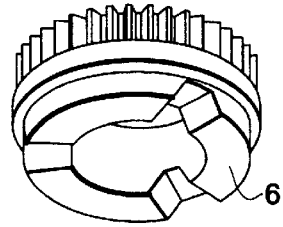
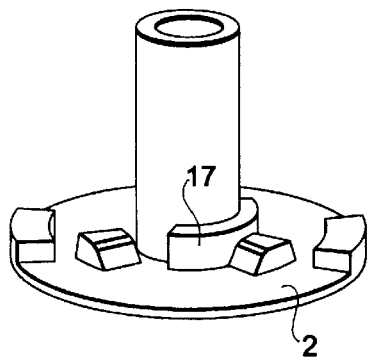
FIG. 12

EXTERNAL REARVIEW MIRROR FOR AUTOMOBILES

FIELD OF INVENTION

The present invention relates to a rearview mirror mounted on the external surface of an automobile, in general, and to a mechanical drive mechanism forming part of the mirror, in particular.

DESCRIPTION OF RELATED ART

A rearview mirror is disclosed in DE-OS 44 27 410 A1. The known external rearview mirror can be pivoted with the help of a drive from the automobile's drive position to its park position in which the housing of the mirror is folded against the automobile. The drive which changes the position of the mirror housing, has a gear wheel which is arranged coaxially with the pivoting axis. In order to limit the pivot path, cams are provided on the mirror base side which engage in grooves on the mirror head whereby, in functional position in the area between the drive and park positions, the mirror base cams engage in the recesses of the gear wheel that rests on the cams under the force of a compression spring.

In the prior art rearview mirror, the same cams attached to the base of the mirror are used both for the contact surface function and for the latching function; for this reason, the pivot path is determined by the arrangement and the number of latching cams. The latching cams are arranged at three equal intervals of 120° since by this means definite support is established and with a disengaged gear wheel a movement of no more than 120° is required to bring the gear wheel back into a latch position. The pivot path is even shorter due to the length of the cams. If a greater pivot path is to be realized, significant disadvantages would have to be taken as a tradeoff.

An additional disadvantage of the known drive is the fact that the mirror cannot be brought from a disengaged condition, brought about by the action of an external force, back into the drive position by a motor, but rather must be accomplished manually.

In an additional prior art rearview mirror, it is necessary to maintain the meshing of the gear wheel with the worm drive wheel both in functional position and in disengaged position in order to ensure the functioning of the known drive.

Since a situation is possible in which the mirror head and the drive are in a position lifted away from the mirror base, and the gear wheel is engaged with the mirror base, the width of the toothing on the gear wheel must be large enough so that the meshing of the teeth is maintained even if the gear wheel moves axially. For this arrangement relatively large components are required.

SUMMARY OF THE INVENTION

It is an object of the invention to create a rearview mirror for automobiles which can be brought back by a motor from any position into a drive position without increasing the number of parts and the manufacturing cost, and without increasing component size.

In accordance with the invention, this objective is realized in the following way.

a) A mirror head assumes at least three defined levels along a pivot axis 44 (A,B,C);

b) the lowest level (A) is possible only between the drive position (F) and the park position (P);

c) the three levels are defined by a latching structure on the gear wheel and the mirror base;

d) the highest level (C) is defined by the latching structure on the mirror base, and by the gear wheel or by the structure on the gear wheel and by the mirror base; and e) the middle level (B) is defined by the mirror head and by the mirror base.

A clear separation of the functions is possible through the three defined levels (A,B,C). Since the lowest level (A) is possible only in operating position, i.e., between drive position (F) and park position (P), the mirror head cannot be locked in a folded forward manner in the direction of travel (K). In this way, the problem of manually moving back into driving position through the latch is eliminated. Further, that the gear wheel is free of play is ensured by the fact that the lowest level (A) is defined by the latching structures on the gear wheel and on the mirror base. Since the highest level (C) is defined by the latching structure on the mirror base and by the gear wheel or by the latching structure on the gear wheel and by the mirror base, it is ensured that the mirror head can be activated by the motor even in disengaged condition and that, upon being driven by the motor against the folding-path limiter, the latching cams can enter into a defined positive fitting union with the latching recesses. The middle level (B) is defined by the mirror head and the mirror base whereby the frictional force between the mirror base and the mirror head is less than the force required to break the connection between the gear wheel and the mirror base. The mirror head can therefore be reliably brought back into driving position from any position, even under conditions in which undefined frictional relationships occur.

In a preferred embodiment of the invention, the gear wheel is positioned so as to not move axially in relation to the mirror head, or so as to be movable with only slight play. In this way, the gear wheel does not have to have widened gearing in order to remain engaged at all times with another gear element, such as a worm. In the present invention no situation occurs in which the mirror head is in an elevated position while the gear wheel is fully engaged. This characteristic also leads to the minimization of the space requirements for the entire drive.

The latching means advantageously consist of latching cams and latching recesses. By means of the cams and recesses, in contrast to ball catches, at least a frictional union between the mirror base and the gear wheel is possible even in the unlatched condition. By this structure the mirror head continues to be adjustable by the motor. The frictional contact also prevents the mirror head from being able to move loosely.

The invention allows a number of variations. Thus the latch cams and/or the latch recesses can have at least two zones, with differing angles of inclination, which facilitate differing functions of the latching cams at different vertical levels, such as the avoidance of a blocked situation or driving against the contact surface.

In the case of configuring the latching cam in the zone close to the mirror base with a smaller angle of inclination, it is ensured that the drive itself cannot cause disengagement. In a zone away from the mirror base, on the other hand, possible excess latching of the latching cams can be desired and therefore the angle of inclination can be configured correspondingly large.

The same effect can be achieved if the latching recesses are configured differently in different zones whereby, in this case, the zone away from the mirror base has a smaller angle of inclination and the zone close to the mirror base has a larger one. The differing zones of the latching cams can also be combined with differing zones of latching recesses.

In place of surfaces inclined at differing angles, it is also possible to provide rounded portions in one zone of the latching cams of the mirror base or of the latching recesses of the gear wheel. The rounding can also be combined with surfaces on the corresponding counterpart. By this means, the forces can be matched in a simple manner to the particular needs is a given instance.

The particular design of the latching cams and/or of the latching recesses makes it possible if needed to do without any overload protection for the motor. In particular with the mirror folded out to the front in the driving direction (K) (see FIG. 10), the drive as a result of this cannot become locked. Therefore, the motor also cannot heat up excessively when improperly operated. Malfunctions cannot occur in the stop position even if a PTC resistor is provided for other reasons as a protective element for the motor. If locking up were possible, it would be possible for the motor as well as the PTC to overheat, resulting in the motor being switched off by the PTC. If in this situation the drive should be switched, brief outages of functionality would occur because the PTC would transmit little current, while the current requirements would be particularly high, specifically in the locked position.

In accordance with another essential characteristic of the invention, the number of grooves or recesses in the mirror head is smaller than the number of latching recesses in the gear wheel. Preferably, the mirror head has two grooves or recesses and the gear wheel has three latching recesses. By means of this configuration, the advantages of the mirror in accordance with the invention, can be utilized even with an enlarged pivot range.

It has proved advantageous to configure the fold-path limiter such that it can interact through all defined vertical levels (A,B,C) with a component fixed on the mirror head.

The component space of the drive is further reduced through the fold-path limiter being arranged in a ring-shaped space between the pipe fixed to the mirror base and the gear wheel. According to one aspect of the invention, the gear wheel of the drive, which is configured as a worm wheel and can mesh with the mirror base, has spur teeth and the worm shaft is borne diagonally in the drive housing. This geometry facilitates the manufacture of the gear wheel from sinter metal or zinc die casting.

These and other objects and advantages of the invention will become more fully apparent from the description and claims which follows, or may be learned by the practice of the invention.

BRIEF DESCRIPTION OF THE SEVERAL VIEWS OF THE DRAWINGS

The figures are briefly described as follows:

FIG. 6 is an illustrative example of latching and contact cams in a drive position (F) (Level A).

FIG. 7 is an illustrative example of latching and contact cams in a parked position (P) (Level A).

FIG. 8 is an illustrative example of latching and contact cams in a disengaged position (K) (Level C).

FIG. 9 is an illustrative example of latching and contact cams in an intermediate position (Level B).

FIG. 11 is a bottom view of a drive mechanism for unfolding an automobile rearview mirror.

FIG. 12 is an exploded perspective view of a contact and latching means found in the present invention.

DETAILED DESCRIPTION OF THE INVENTION

Figure 1:
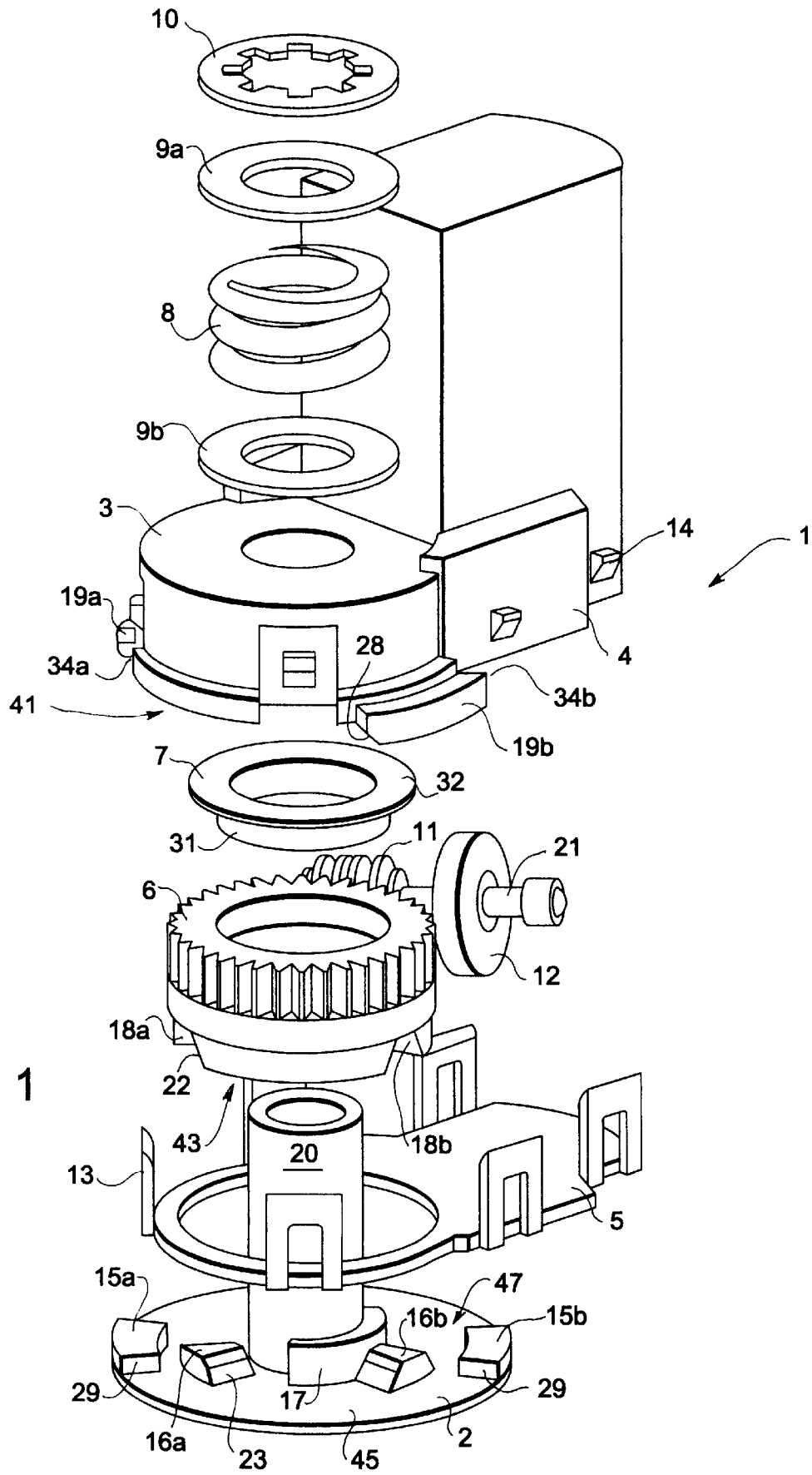
FIG. 1 is an exploded view of the drive embodying the present invention.

FIG. 1 shows an exploded view of inventive drive 1, comprising drive housing 4, that is formed with mirror head 3. The bottom rim 41 of mirror head 3 contains contact faces 19a, 19b, which have sloping surfaces 28 bordered by grooves or recesses 34a and 34b. The drive housing also has latching lugs 14. A catch 5 contains latching eyes 13 for mating with lugs 14. A shaft 21 with a worm wheel and a worm 11 mates with a gear wheel 6 that absorbs latching recesses 18a, 18b, 18c having sloping surfaces 22. A mirror base 2 includes an upwardly extending pipe 20 as part of a joint. The mirror base also includes a fold-path limiter 17, stop cams 15a, 15b with sloping surfaces 29 and latching cams 16a, 16b, 16c with sloping surfaces 23. The structure is completed with a sliding ring 7, washers 9a, 9b, a compression spring 8, and a locking washer 10.

Figure 2:
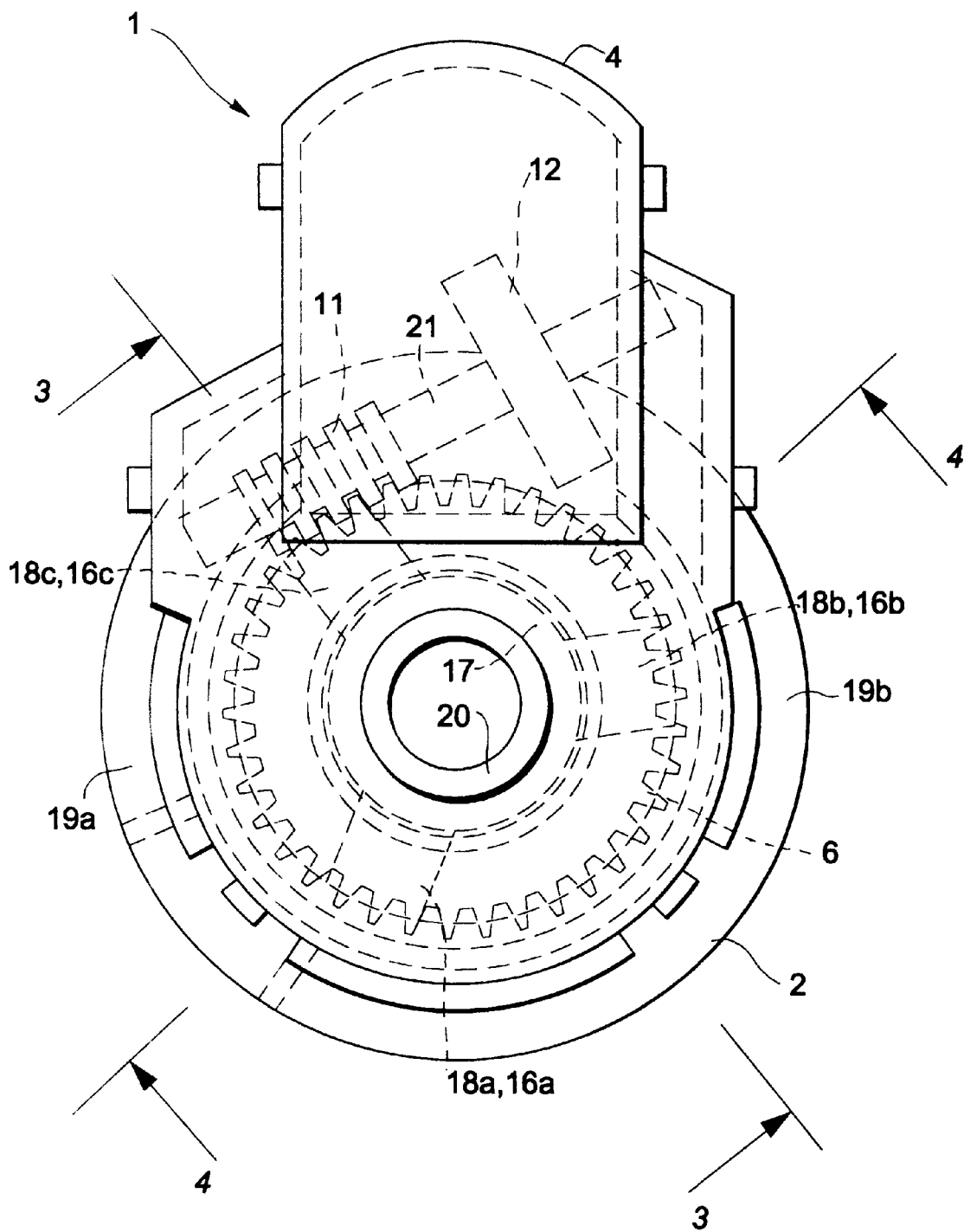
FIG. 2 is a transparent view of the drive of FIG. 1 viewed from above.

FIG. 2 shows a transparent top view of drive 1 from above revealing the drive housing 4, the shaft 21, the worm wheel 12, the worm 11, the gear wheel 6, the mirror base 2 with the fold-path limiter 17, and the pipe 20. The gear wheel 6 is engaged by means of latching recesses 18a, 18b, 18c formed on the bottom 43 of gear wheel 6 with the latching cams 16a, 16b, 16c formed on the top surface 45 of the mirror base 2. The latching recesses 18a, 18b, 18c and the latching cams 16a, 16b, 16c have sloping surfaces 22, 23, respectively, which make is possible for the gear wheel 6 to disengage upon application of an external force against the mirror head. The external force must be sufficient to overcome the force of the compression spring 8.

Figure 3:
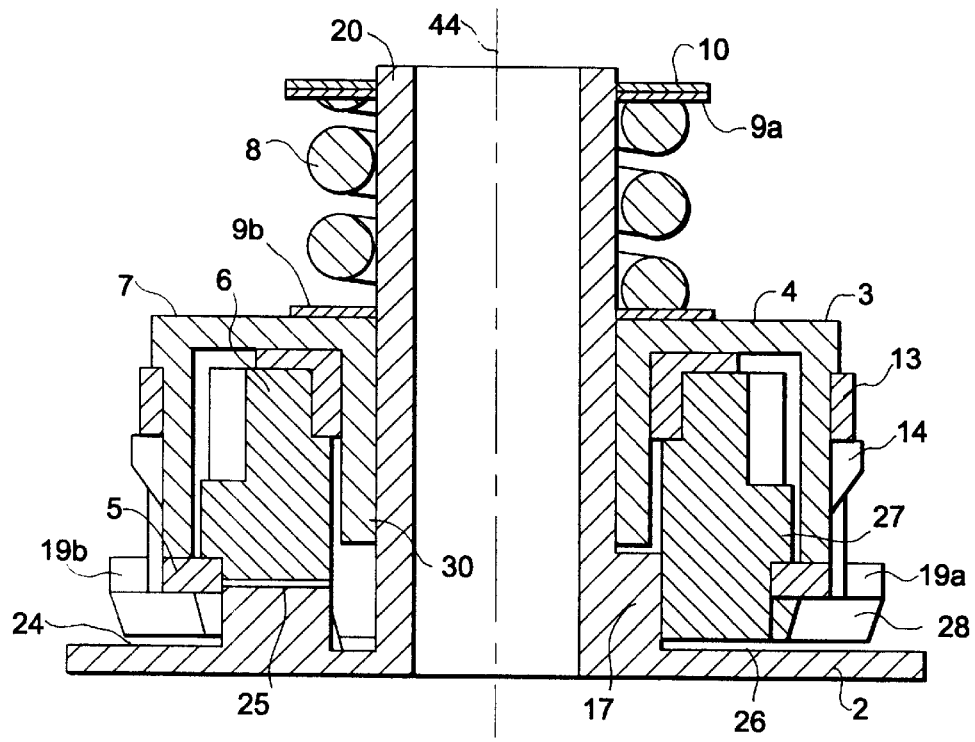
FIG. 3 is a section view taken along lines B—B of FIG. 2.

FIG. 3 is a section taken along lines B—B in FIG. 2. As can be seen, the compression spring 8, which rests by means of the washer 9a and the locking washer 10 on the pipe 20 fixed to the mirror base. The spring 8 presses the gear wheel 6 by means of the washer 9b, the drive housing 4, and the sliding ring 7 against the mirror base 2. The drive housing 4 surrounds and contains the sliding ring 7 and the gear wheel 6 and is closed through a mating relationship with the housing closure 5 through the complementary latching lugs 14 and the latching eyes 13. Between the mirror head 3 and the mirror base 2, there is a space to provide play 24. As a result of additional free spaces 25, 26 on the gear wheel, a flat fit between mirror base 2 and gear wheel 6 is ensured thus preventing the possibility of twisting play. The gear wheel 6 about its periphery has a ring-shaped projection 27 which allows the wheel to sit upon the housing closure 5. By this means the gear wheel 6 either cannot shift or can shift only slightly relative to the worm 11 found on shaft 21. The fold-path limiter 17 is arranged in a ring-shaped space 47 found between the gear wheel 6 and the pipe 20. The limiter 17 is secured to the top surface 45 of the mirror base. The contact cams 15a and 15b are formed on the top surface 45 near the periphery of mirror base 2 and have sloping faces 29 against which the correspondingly sloping contact faces 28 of contact faces 19a and 19b come to rest. The pitch of the sloping faces 28, 29 corresponds essentially to the pitch of the sloping faces 22 and 23 at the gear wheel and at the mirror base, respectively. The sloping faces are selected such that the force of the compression spring 8 cannot normally be overcome by the drive, but indeed can be overcome by a force which acts upon the mirror head from without (for example impact against an obstacle). For purposes of improved tracking, the drive housing 4 is provided with a sleeve 30 which serves as a second linking part. This sleeve occupies the ring-shaped space between pipe 20 and toothed wheel 6 that is not occupied by the folding-path limiter 17.

Figure 4:
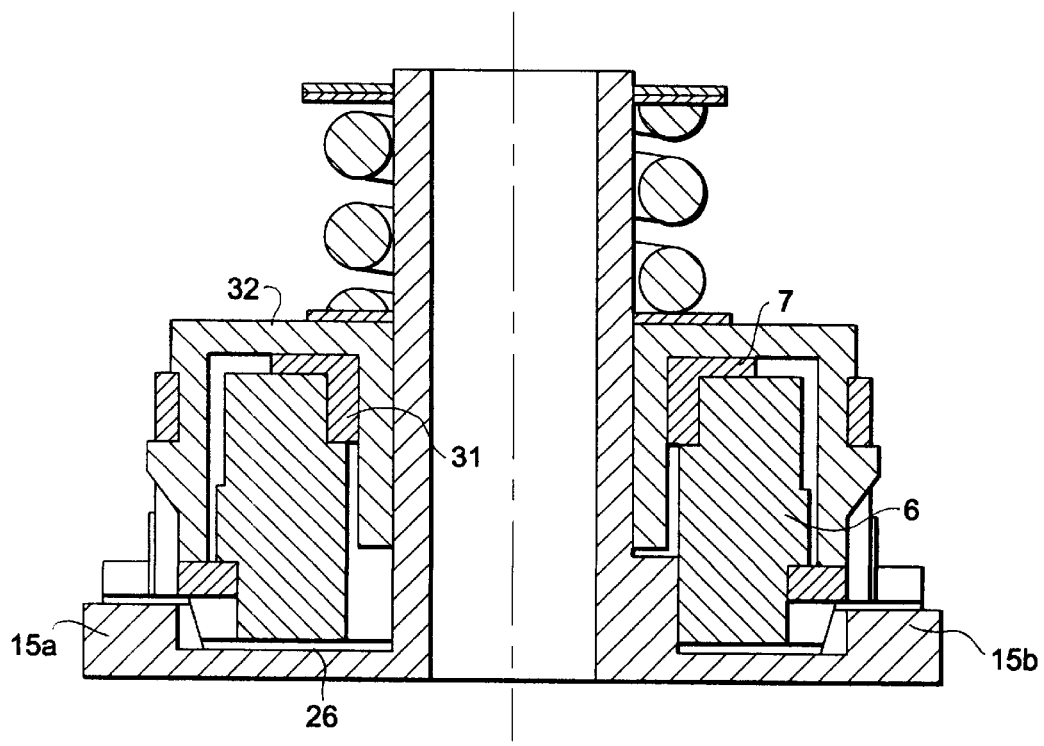
FIG. 4 is a section view taken along lines A—A of FIG. 2.

In FIG. 4, a section view along lines A—A of FIG. 2 is presented. On the basis of the free space 26 formed between the top surface 45 of mirror base 2 and the bottom 13 of gear wheel 6, the gear wheel rests on the sloping faces 23 of latching cams 16a and 16b of the mirror base 2 and fits closely without play against the sliding ring 7. As shown in FIGS. 1 and 4, the sliding ring 7 comprises a ring 31 and a flange 32, by which means improved tracking by the gear wheel 6 is achieved. As can be clearly seen in FIGS. 3 and 4, the contact cams 15a and 15b are arranged at angles which do not coincide with the angles of the latching cams 16a, 16b, 16c.

Figure 5A:
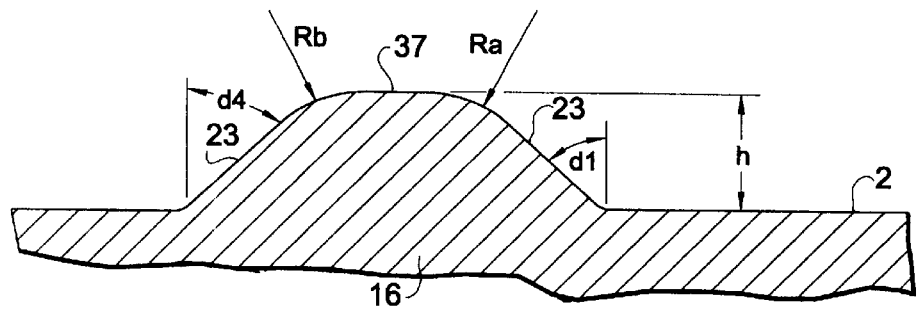
FIGS. 5a–5c are illustrative examples of latching cams used in the inventive drive.

FIG. 5a shows a latching cam 16 with two sloping surfaces 23, a plateau 37, and the radii Ra and Rb in the transition zone between the sloping surfaces 23 and the plateau 37.

Figure 5B:
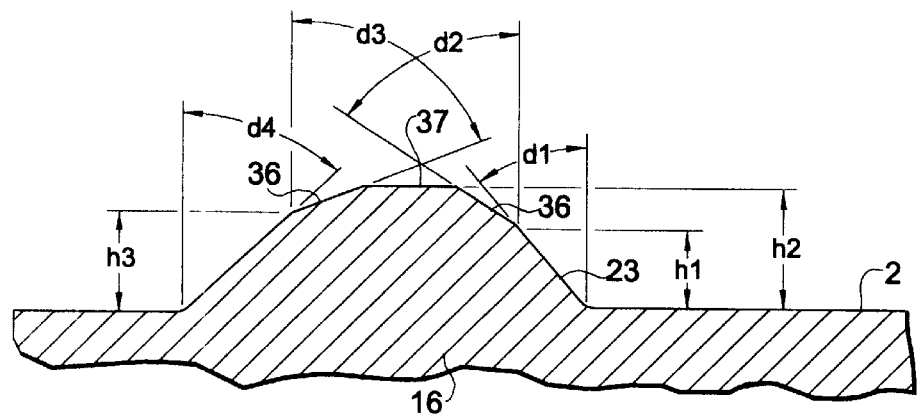
Figure 5C:
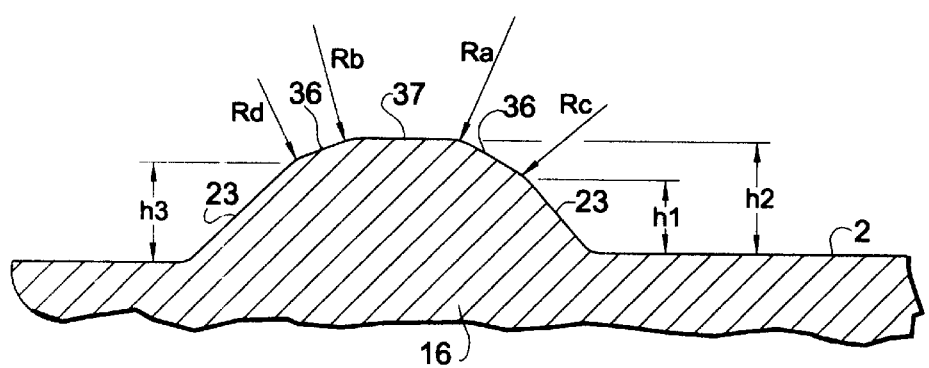

In FIG. 5b instead of the radii, sloping surfaces 36 are formed between the sloping surfaces 23 and the plateau 37, whereby the sloping surfaces 36 have larger angles of inclination than the sloping surfaces 23. Angle α2 is therefore larger than angle α1. Since the angle of inclination of the areas 36 on the two sides of the latching cams 16a, 16b, 16c can also differ depending on the application, α2 is smaller in FIG. 5b than α3. The same also applies for the pitch of the sloping surfaces 23. Therefore angle α4 is presented here to be larger than angle αa. Normally angle α2 is the same as angle α3 and angle α1 is the same as angle α4. FIG. 5c shows a similar latching cam as in FIG. 5b. The only difference is that radii Ra, Rb, Rc, and Rd are provided between the individual, differently inclined sloping surfaces 23, 36, 37. The sloping surfaces 36 in FIG. 5b and the radii in FIG. 5c begin at the vertical levels h1, h2, and h3 measured from the top surface 45 of mirror base 2, whereby h1 and h3 can be the same or different. The same shapes and angle relationships as were shown for the latching cams 16a, 16b, 16c can also be formed for latching recesses 18a, 18b, 18c of gear wheel 6. Also, a combination of the individual possible forms of latching cams with the individual possible forms of latching recesses is contemplated.

FIG. 6 shows the latching and contact cams in drive position F. Here the mating contact surface 19a or mirror head 3 is in contact with the contact cam 15a of the mirror base 2, and the gear wheel 6 is in latched position with the latching cams 16a 16c of the mirror base 2. The mirror head 3 is on level A at the mirror base 2. By means of motorized movement, the mirror head 3 can now be driven in the direction of the arrow toward the contact cam 15b. This position is shown in FIG. 7. The angle of inclination of the sloping surfaces 28 and 29 are selected such that the contact cams 15a and/or 15b of drive 1 cannot be overcome against the force of the compression spring 8. The mirror head 3 in the drive position or park position is not in contact with the fold-path limiter 17.

Figure 10:
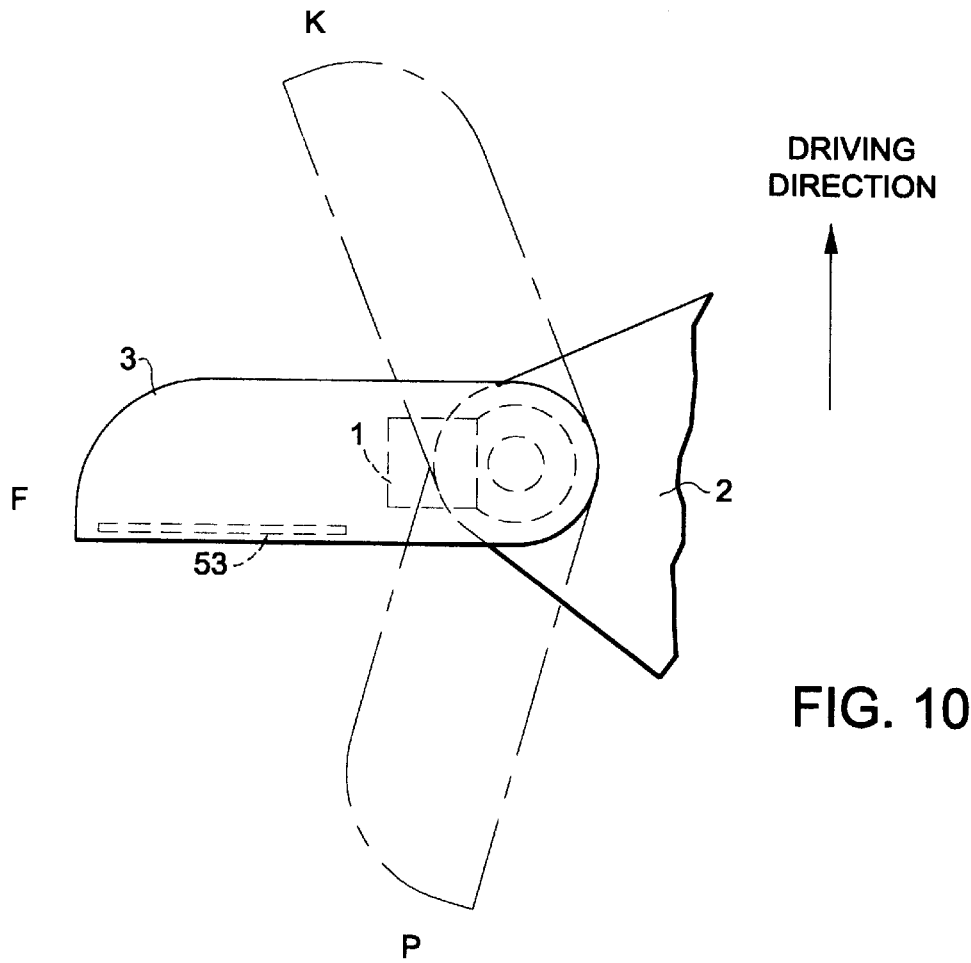
FIG. 10 is a schematic view of a rearview mirror for automobiles embodying the present invention.

In FIG. 8 the disengaged mode is presented which occurs if an external force acts on the mirror head and unfolds it forwards in the driving direction (FIG. 10). In this process, the gear wheel rides with its faces 38, which are situated between the latching recesses 18a–18c, up onto latching cams 16a–16c by which means the highest level (C) of the mirror head 3 is reached in relation to the top surface 45 of the mirror base 2. An intermediate space 33 remains between mirror head 3, 19 and mirror base, 2, 15 which determines the difference in levels between level B and level C. On the basis of the frictional relationships (coefficient of friction and friction radius) between surfaces 38 and plateau 37, and between the gear wheel 6 and the glide ring 7, the mirror head 3 moves when driven by the motor in this position with respect to the mirror base 2 until one of the folding-path limiters is reached, at which point the mirror head 3 rests against the mirror base 2 leading to the situation depicted in FIG. 9. The gear wheel 6 moves at the folding-path limiter with respect to the mirror base 2 until the latching recesses 18a–18c engage in the latching cams 16a–16c. The mirror head 3, however, can be lowered with respect to the mirror base 2 only to the middle position on level B because at that point the mirror head 3 rests with its mating contact surfaces 19a, 19b on the contact cams 15a, 15b of the mirror base 2. The angle of inclination of zone 36 is selected such that it can be overcome by the drive when the mirror head comes against the folding-path limiter. The disengagement force between the gear wheel 6 and zone 36 of latching cams 16a, 16b and 16c, however, is greater than the friction between mirror base 2 and mirror head 3.

FIG. 10 shows the rearview mirror in drive position F. It comprises the mirror base 2, which is to be attached to the automobile, the mirror head 3 which bears the mirror 53, and the drive 1 attached to the mirror head. Park position P and the position unfolded toward the front K in the driving direction are indicated in broken lines. Naturally a drive attached to the mirror base which meshes with a gear wheel locked in the mirror head would function in the same manner.

FIG. 11 shows a drive for folding an automobile rearview mirror. The drive includes a drive housing 4, an electric motor 39 which is contained in the housing with a motor worm 60 attached to the shaft 51 of the motor 39, and a shaft 21 positioned in the drive housing 4 with a worm wheel 12 attached thereto which meshes with the motor worm 60. A worm 11 is formed in one piece with the shaft 21 or is attached thereto. The worm 11 meshes with a gear wheel 6 which serves as a worm wheel, whereby the gear wheel 6 has spur teeth 61, and a shaft 21, inclined at the angle of inclination of the worm 11, is positioned in the drive housing 4. The helical angle of the worm wheel 12 is smaller than the angle of inclination of the motor worm 60. The worm wheel 12, however, can also be spur-toothed. In the event the inclination of the two worms 11, 60 is equal, the motor 39 can be installed vertical to the plane of the gear wheel. As a result of the spur toothing, it is possible for the gear wheel 6 to be manufactured with sinter or die cast technology. In addition, the gear wheel, as a result of the spur toothing, can be one piece with latching means, projections and/or contact surfaces, and/or bearing means, etc.

In FIG. 12, the contact surface means and latching means on the three interacting components, i.e., mirror base 2, drive housing 4 as part of the mirror head 3, and gear wheel 6 are depicted. The folding-path limiter 17 works together with the part 42 of the drive housing when the mirror head is acted upon by an external force to limit the relative rotation of the mirror head.

Figure 13:
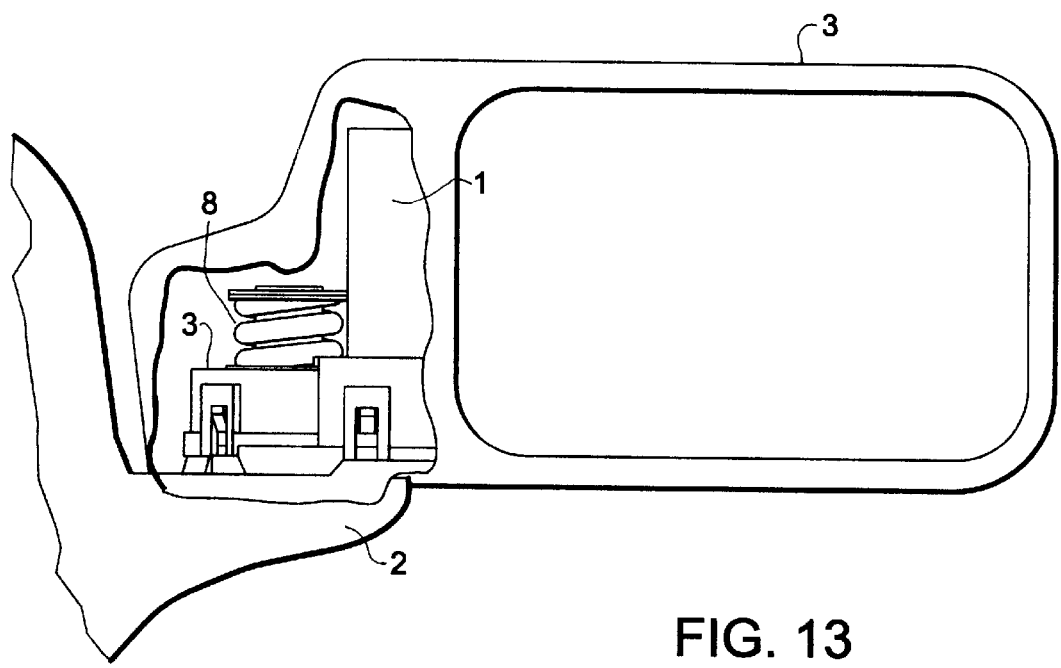
FIG. 13 is a plan view partially cut away of an automobile rearview mirror in accordance with the present invention.

FIG. 13 shows the automobile rearview mirror in accordance with the invention with the mirror base 2, the mirror head 3, and the drive 1.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A rearview mirror device for a vehicle, said mirror device comprising:

a mirror base adapted to be fastened to the vehicle;

a mirror head which includes a mirror and which is pivotable relative to the mirror base around a pivot axis;

a first contact surface formed on the mirror head;

a second contact surface formed on the mirror base for cooperating with the first contact surface for limiting the pivotal rotation of the mirror head relative to the mirror base from at least a drive position to a parking position;

drive means;

a gear wheel connected to the mirror base and arranged coaxially to the pivot axis, the gear wheel engaging with the drive means;

a fold-path limiter positioned between the mirror head and the mirror base for limiting the movement of the mirror head relative to the mirror base;

a compression spring for urging the gear wheel toward the mirror base; and latching means, defined on the gear wheel and on the mirror base; wherein:

1) the mirror head is operative in at least three predetermined levels (A,B,C) as measured along the pivot axis relative to the mirror base, 2) level A is possible only between the drive position and the park position, and is defined by the latching means, 3) level C is defined:

3a) by a first portion of the latching means that is on the mirror base, and by the gear wheel or 3b) by a second portion of the latching means that is on the gear wheel, and by the mirror base, and 4) level B is defined by the mirror head and the mirror base.

2. The rearview mirror of claim 1, wherein the gear wheel is positioned so as to not be axially movable in relation to the mirror head or so as to be movable with only slight play.

3. The rearview mirror of claim 1, wherein the latching means includes:

latching cams and latching recesses, wherein the latching cams are arranged on one of the mirror base or the gear wheel.

4. The rearview mirror of claim 3, wherein:

at least one of the latching cams and the latching recesses has at least a first zone that is close to the at least one of the latching cams and the latching recesses and a second zone that is away from the at least one of the latching cams and latching recesses, on their latching flanks with angles of inclination ($\alpha 1$, $\alpha 2$, $\alpha 3$, $\alpha 4$), in the first zone, the angles of inclination ($\alpha 1$, $\alpha 4$) are provided, and in the second zone, the angles of inclination ($\alpha 2$, $\alpha 3$) are provided.

5. The rearview mirror of claim 4, wherein the angle ($\alpha 1$) is smaller than or the same as angle ($\alpha 2$) and angle ($\alpha 4$) is smaller than or the equal to angle ($\alpha 3$).

6. The rearview mirror of claim 3, wherein at least one of the latching cams and the latching recesses of the gear wheel are provided at least in part with rounded shoulders.

7. The rearview mirror of claim 3, wherein:

the cams are shaped to allow the mirror head to be brought by the drive means into contact position from level B to level C but not from level A to level B or C.

8. The rearview mirror of claim 7, wherein:

the mirror head is constructed and arranged to be brought by the drive means from level B to level C in only one direction of rotation.

9. The rearview mirror of claim 1, wherein:

the mirror head is constructed and arranged so that it is not possible for the drive means to bring the mirror head from level A to level B, nor from level B to level C.

10. The external rearview mirror of claim 1, wherein the mirror head includes a first plurality of recesses and the gear wheel includes a second plurality of recesses.

11. The rearview mirror of claim 1, wherein two recesses are formed in the mirror head and three latching recesses are provided in the gear wheel.

12. The rearview mirror of claim 2, wherein:

the gear wheel is positioned within a drive housing.

13. The rearview mirror of claim 10, wherein:

the recesses in the mirror head have the same angle of inclination as the latching recesses in the gear wheel.

14. The rearview mirror of claim 10, wherein both the latching recesses in the gear wheel as well as the recesses in the mirror head fit in a planar manner with the corresponding mating contact surfaces in the mirror base.

15. The rearview mirror of claim 1, further comprising:

means attached to the mirror head for interacting with the fold-path limiter on all levels (A,B,C) along the pivot axis.

16. The rearview mirror of claim 1, wherein:

the fold-path limiter is arranged in a ring-shaped space between a pipe attached to the mirror base and the gear wheel.

17. The rearview mirror of claim 1, wherein:

the gear wheel has spur teeth, a drive shaft is positioned in a drive housing inclined with respect to a plane of the gear wheel by an angle of inclination of a worm, and the drive shaft is operatively connected to the drive means.

18. The rearview mirror of claim 17, wherein the gear wheel is made of sintered metal or zinc die casting.

19. The rearview mirror of claim 17, wherein the gear wheel is one piece with at least one of:

latching means projections and bearing means.

20. The rearview mirror of claim 1, wherein:

a helical gear angle of a worm wheel is smaller than the angle of inclination of motor worm.

* * * * *